Sept. 22, 1942.  H. N. STOVER  2,296,747
EXPLOSIONPROOF STORAGE BATTERY
Filed Nov. 4, 1939  2 Sheets-Sheet 1
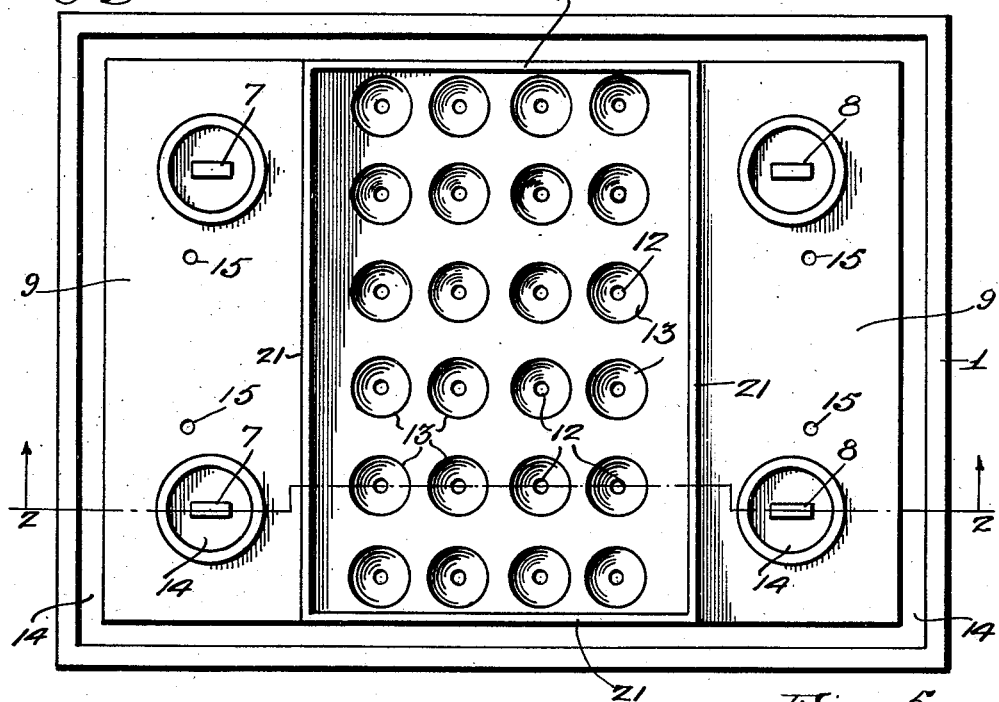
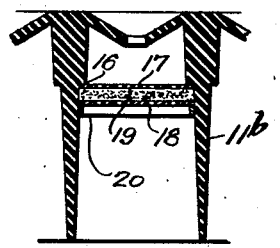
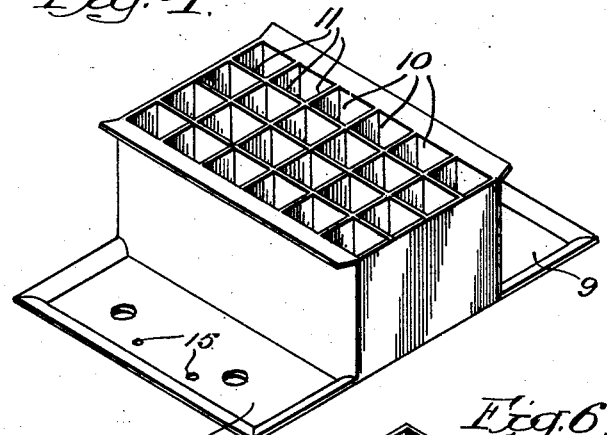
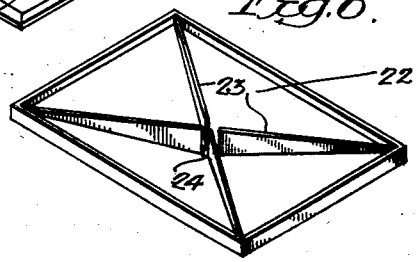
Inventor
Harvey N. Stover
by his Attorneys Sept. 22, 1942.                H. N. STOVER                2,296,747
                      EXPLOSIONPROOF STORAGE BATTERY
                         Filed Nov. 4, 1939        2 Sheets-Sheet 2
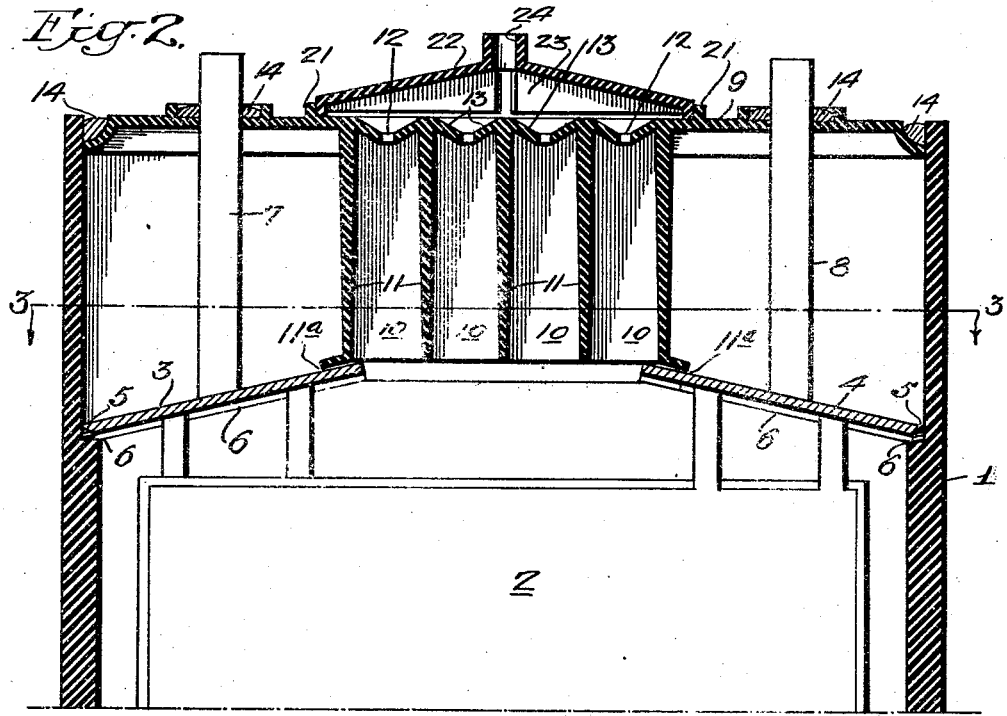
Inventor
Harvey N. Stover
by his Attorneys
Howson & Howson Patented Sept. 22, 1942

2,296,747

UNITED STATES PATENT OFFICE 2,296,747

EXPLOSIONPROOF STORAGE BATTERY

Harvey N. Stover, Haddonfield, N. J., assignor to Philco Corporation, a corporation of Pennsylvania Application November 4, 1939, Serial No. 302,922

7 Claims. (Cl. 136—179)

This invention relates to storage batteries, and more particularly to storage batteries of the lead acid type, wherein the products of the chemical reactions during the charging or discharging of the battery cells include a mixture of gases which may be combustible or explosive. For example, common batteries of this type yield a mixture of hydrogen and oxygen, particularly toward the end of the charging cycle.

It is well known that these explosive gases may be ignited by sparks or other static discharges which may occur, particularly during the filling or testing of a cell, in spite of all reasonable precautions. In the case of large batteries especially, the chamber provided to permit the rise and fall of the electrolyte level may contain a sufficient quantity of mixed gases to crack or break the cell container if these gases are ignited. This destruction of the cell, and the consequent acid spray and spilling not only involves costly damage but also constitutes a serious hazard to the physical being of attendants or other persons.

Heretofore, various efforts have been directed toward prevention of explosions in batteries of this type.

According to the present invention, however, an adequate solution of the problem is attained, not by seeking to prevent entirely the explosion of gases but by effectively controlling the explosion in a manner to prevent any deleterious effects therefrom. This result is achieved by dividing the normal gas chamber into a plurality of passages or separate chambers, each incapable of containing a quantity of gas sufficient to cause any damage to the cell should the gas become ignited.

The principal object of this invention, therefore, is to provide a novel storage battery construction of this type which is completely free of any danger of harm or destruction, due to the combustion or explosion of gases liberated during the operating cycles of the battery.

Another object of the invention is to provide novel means for dividing or partitioning the liberated gases so as to prevent the occurrence of any potent explosion.

Still another object of the invention is to provide a novel honeycomb structure for partitioning the liberated gases and localizing any explosion at its inception.

Other objects and features of the invention will appear hereinafter.

In the accompanying drawings:

Fig. 1 is a horizontal plan view of a battery cell embodying the invention;

Fig. 2 is a sectional view taken along line 2—2 of Fig. 1;

Fig. 3 is a horizontal section taken along line 3—3 of Fig. 2;

Fig. 4 is a perspective view of the honeycomb top structure of the cell;

Fig. 5 is a fragmentary sectional view of a modification; and

Fig. 6 is a perspective view of a cover which may be employed.

In the drawings, 1 represents the cell container which may be formed of hard rubber, glass, or other suitable material. The plate elements and separators are indicated generally at 2. The plate connector straps are shown at 3 and 4. In the present instance, these straps are extended to three walls of the container and engage a resilient compress or cushion 5 on wall shoulders 6 (see Figs. 2 and 3), and the straps are inclined as illustrated to serve additionally as gas deflecting baffles. The resilient cushion 5 seals the edges of these baffles. Of course, conventional straps and separate baffles could be used, if desired. Terminal posts 7 and 8 extend from the straps 3 and 4 in conventional manner. The cell is filled with electrolyte to a level well above the straps, the minimum level of the electrolyte coinciding substantially with the position of the section line 3—3 in Fig. 2.

In accordance with the invention, the cell top structure 9, which may be constructed from a single piece of molded hard rubber, is formed to provide at its central section a plurality of small chambers 10, as shown particularly in Figs. 2, 3 and 4. These chambers are defined by depending intersecting vertical partitions 11 and extend vertically from the top downward to the electrolyte. Each chamber 10 is provided with a small opening or vent 12 formed in the center of a countersunk or concavo-convex baffle structure 13. The purpose of these individual baffle structures will be explained presently. The plate straps 3 and 4 preferably extend far enough to overlap the central section of the top structure, as shown in Fig. 2, but there are spaces 11a to permit free passage of the electrolyte.

The component parts of the cell, as above described, may be assembled in the normal manner, and the cover and terminal posts may be sealed by a compound 14.

In the operation of the cell, the electrolyte is maintained above the low level mentioned. During periods of charge, oxygen and hydrogen are given off from the plates and gas bubbles will rise through the electrolyte. This gas will be deflected by the straps 3 and 4 so that it will pass through the chambers 10 and the vents 12 into the atmosphere. By this novel construction, the gas chamber within the cell is so divided that no chamber of appreciable size may become filled with explosive gas, as in the case of common batteries. Instead, the gas chamber comprises a honeycomb structure of small chambers, each completely separate from all other chambers. In the event that a spark occurs near a vent hole in the top of the cell, the gases present within the associated chamber may be ignited, but only an impotent explosion, generating a low pressure within one of the chambers 10, will result. Consequently, there will be no noticeable disturbance to the cell. In some cases, a spark may be sufficiently intense to ignite the gases in several of the chambers 10, or a flash-over may occur from chamber to chamber externally of the cell, but it has been found that in no case will there be any damage to the cell. This is due in part, at least, to the large number of gas escape vents 12 which do not permit high pressures to build up within the small chambers.

Thus, according to the invention the liberated gases are divided or partitioned in a manner to prevent the occurrence of any potent explosion within the battery.

In order to permit proper acid circulation within the cell, air escape vents 15 are provided in the flat surfaces of the top 9. If desired, suitable provision may also be made in these surfaces for filling opening, level gages, and specific gravity indicators. These elements have been omitted from the drawings since they may all be of standard construction.

If desired, the above-described construction may be modified to permit the use of standard plate straps in place of the straps 3 and 4. In such a modification, any suitable plate, strap, and terminal post assembly may be fitted into a container, and the top structure may be formed to provide the honeycomb structure over its entire area. In this form, the terminal posts may be arranged to extend through the small chambers and should be properly sealed at the top. At present, this construction is not preferred owing to the difficulty of molding such a large honeycomb structure, particularly since the plate straps can be satisfactorily used as gas deflecting baffles.

The concavo-convex baffle structures 13 serve to reduce acid spray, particularly during charging periods, and also reduce normal electrolyte evaporation. Thus, any vaporized electrolyte striking the under side of the baffle will drain into the cell, while any vaporized electrolyte which may pass through the vent 12 before condensing will also drain into the cell from the upper side of the baffle. If desired, this purpose may be further served by means of the modification shown in Fig. 5, wherein the vertical walls 11b of each chamber are formed with shoulders 16 against which there may be fitted a small perforated square baffle 17 of sheet rubber. In addition, a similar baffle 18 may be positioned below baffle 17, and the space between these baffles may be filled with stacked slivers of glass wool or any other suitable material 19. The material should be such as to serve as a condensing screen for the vaporized electrolyte without impeding the flow of gases sufficiently to create a pressure within the chambers 10 or cause the explosive gases to leak into the air chambers beneath the flat surfaces of the top structure. To secure the baffles 17 and 18 in position, a suitable retaining ring 20 may be used, or the baffles may be held with a sealing compound.

To further reduce acid spray, electrolyte loss, and the danger of explosion, and to prevent dirt and dust from entering the cell, a cover may be fitted over the openings 12. One suitable form of such cover is shown in Figs. 2 and 6. The cell top 9 may have small ribs 21 thereon within which the cover 22 may be fitted in a moderately tight friction fit. The cover, shown in perspective in Fig. 6, may be substantially flat but reinforced by ribs 23 and may have a single opening 24 for the escape of gases. In a sample cover, measuring 8 x 14 inches, the internal height was limited to about one-eighth of an inch. Thus, the volume enclosed between the top 9 and cover 22 is so small that the ignition of the gases normally therebetween will not result in pressures sufficient to cause damage or injury. The cover 22, by confining the escape of gases to a single vent which may be relatively remote from filling openings or other elements to which an operator is required to have access during charging periods, also reduces the probability of a static discharge igniting the gases.

It will be apparent that further modifications of the battery structure may be made within the scope of the invention, as defined in the appended claims.

I claim:

1. In a storage battery, a container, electrodes and electrolyte within said container, a top or cover for said container having a plurality of vent openings for the release of gases liberated within the battery, an electrolyte expansion chamber within said container above the electrolyte level, a gas-partitioning and conveying structure comprising a plurality of gas passages extending from below the electrolyte level to said vent openings, electrode-connector elements disposed below the electrolyte level and extending upwardly from the container walls to the lower ends of said passages, and a downwardly inclined flange at the lower end of said structure overlapping and spaced from said elements, and forming with the upper portion of said elements downwardly inclined passages.

2. In a storage battery, a container, electrodes and electrolyte within said container, a top or cover for said container having a plurality of separate vent openings for the release of gases liberated within the battery, and means for partitioning and conveying all of the liberated gases to said vent openings, said means including a multiplicity of separate gas passages each extending from below the electrolyte level to one of said vent openings, whereby a forceful explosion of gases is prevented.

3. In a storage battery, a container, electrodes and electrolyte within said container, a top or cover for said container having a plurality of separate vent openings for the release of gases liberated within the battery, and means for partitioning and conveying all of the liberated gases to said vent openings, said means including a structure integral with and depending from said top and forming a multiplicity of separate gas passages each extending from below the electrolyte level to one of said vent openings, whereby a forceful explosion of gases is prevented.

4. In a storage battery, a container, electrodes and electrolyte within said container, a top or cover for said container having a plurality of separate vent openings for the release of gases liberated within the battery, an electrolyte expansion chamber within said container through which explosive gases given off during charging must pass toward said vent openings, and means comprising a gas partitioning structure integral with said top and depending from the under side thereof into said electrolyte and having a multiplicity of separate gas passages each extending from below the electrolyte level to one of said vent openings, for partitioning said expansion chamber and for conveying the liberated gases toward said vent openings, whereby a forceful explosion of the gas content of said chamber is prevented.

5. In a storage battery, a container, electrodes and electrolyte within said container, a top or cover for said container having a plurality of vent openings for the release of gases liberated within the battery, an electrolyte expansion chamber within said container above the electrolyte level, a gas-partitioning and conveying structure comprising a plurality of gas passages extending from below the electrolyte level to said vent openings, gas-deflecting baffles disposed below the electrolyte level and extending upwardly from the container walls to the lower ends of said passages, and means sealing the outer edges of said baffles to prevent passage of gas about said edges.

6. In a storage battery, a container, electrodes and electrolyte within said container, a top or cover for said container having a plurality of separate vent openings for the release of gases liberated within the battery, an electrolyte expansion chamber within said container above the electrolyte level, a gas-partitioning and conveying structure integral with and depending from said top and comprising a plurality of separate gas passages each extending from below the electrolyte level to one of said vent openings, and gas-deflecting means for deflecting gases formed in said electrolyte into said passages.

7. In a storage battery, a container, electrodes and electrolyte within said container, a top or cover for said container having a plurality of separate vent openings in a central section thereof for the release of gases liberated within the battery, an electrolyte expansion chamber within said container above the electrolyte level, a gas-partitioning structure integral with and depending from said section of said top and providing a plurality of individual gas passages each extending from below the electrolyte level upwardly to one of said vent openings, and gas-deflecting means for deflecting the gases formed in said electrolyte into said passages.

HARVEY N. STOVER.